United States Patent Office 3,411,459
Patented Nov. 19, 1968

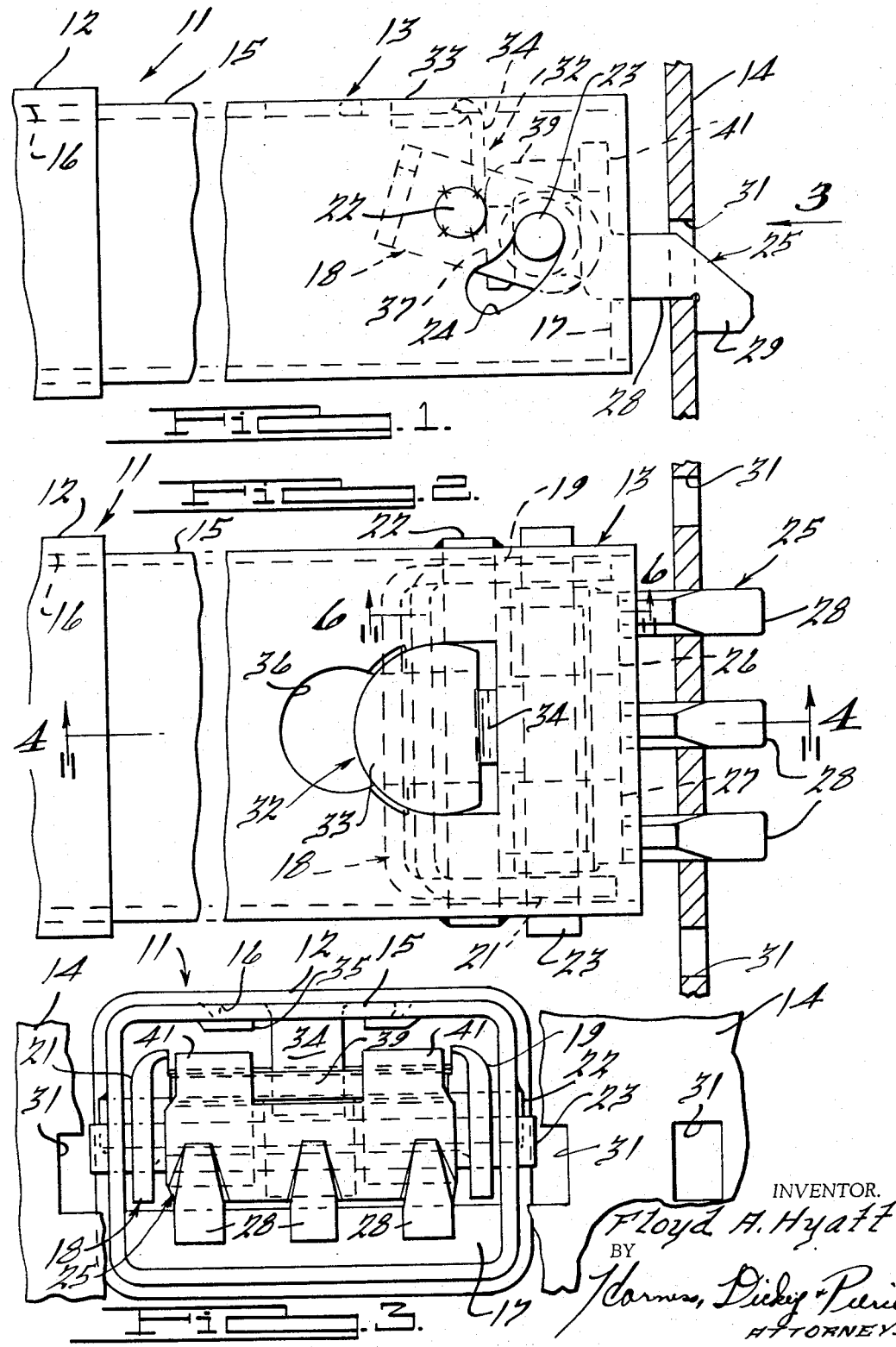

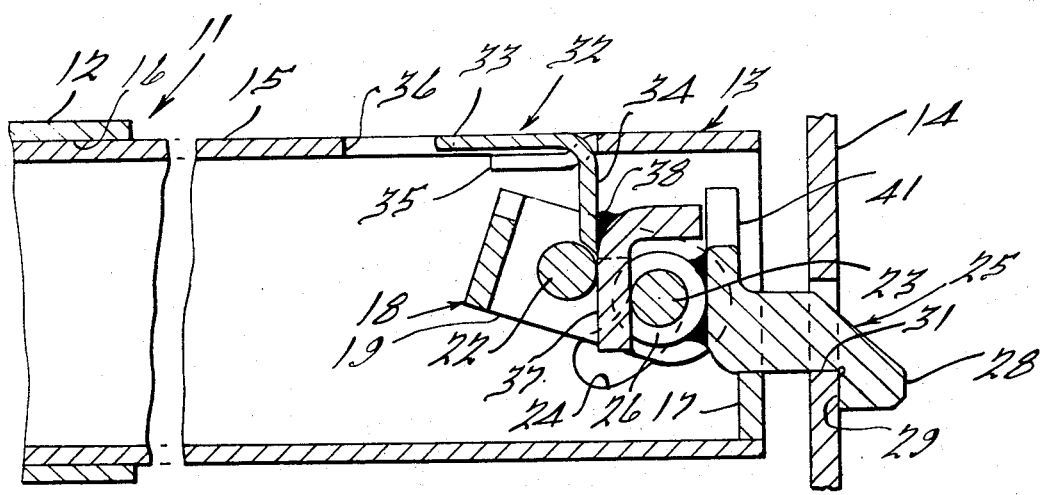
Fig. 4.
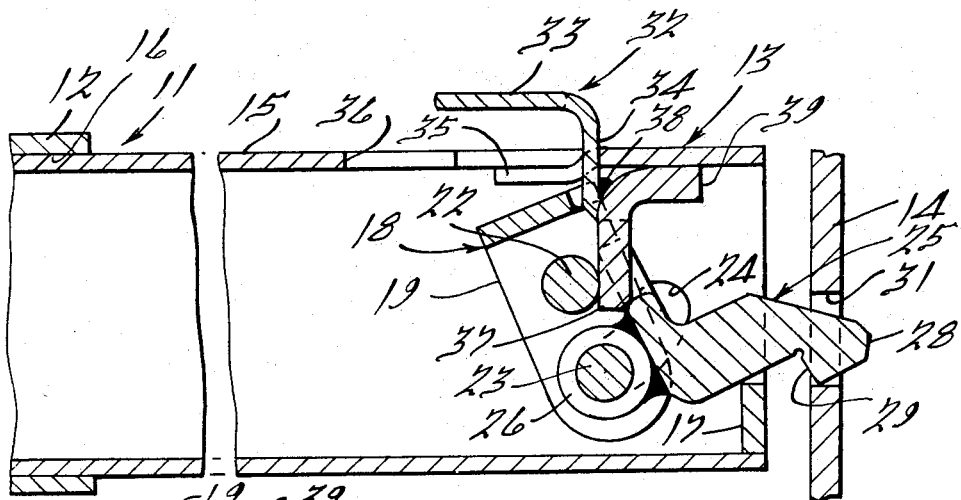
Fig. 5.
Fig. 6.
INVENTOR.
Floyd A. Hyatt

---

3,411,459
FREIGHT BRACING DEVICE
Floyd A. Hyatt, Birmingham, Mich., assignor to Evans
Products Company, a corporation of Delaware
Filed Aug. 24, 1966, Ser. No. 574,737
7 Claims. (Cl. 105—369)

---

ABSTRACT OF THE DISCLOSURE

A freight bracing crossbar including an improved end fitting arrangement. The end fitting includes an attaching member having a hook portion adapted to enter into an aperture in an associated beltrail. The attaching member is pivotally supported at one end of the crossbar on a U-shaped member which is also pivotally supported. A locking member coacts with the U-shaped member and with the attaching member for retaining the attaching member in an engaged position.

---

This invention relates to a freight bracing device and more particularly to an improved end fitting for attaching a freight bracing crossbar or the like to a wall of a cargo area.

Many forms of freight bracing devices have been proposed for bracing freight within cargo areas, particularly the cargo areas of vehicles such as railway cars. One common type of freight bracing device is known in the art as a "crossbar" and which comprises an elongated bar that extends between opposite side walls of the cargo area to engage and brace freight positioned between the side walls. In one form of crossbar arrangement, end fittings are positioned at the opposite ends of the crossbar for attaching the crossbar at selected longitudinal and vertical positions with respect to the side walls. Such end fittings should provide a relatively rigid connection to the side walls so as to withstand the extreme shock loadings experienced in this type of freight handling but should be readily and easily disconnectible for adjustment or removal of the freight.

It is, therefore, a principal object of this invention to provide an improved end fitting for attaching a freight bracing crossbar or the like to the walls of the cargo area.

It is a further object of this invention to provide an improved end fitting that offers a relatively rigid connection to the side walls but can be readily disconnected.

It is yet a further object of the invention to provide an end fitting for attaching a crossbar to the cargo area walls and which insures against accidental release of the crossbar.

An end fitting embodying this invention is particularly adapted for attaching a freight bracing crossbar or the like to a member having spaced openings which member is fixed relative to a wall of a cargo area. The end fitting comprises an attaching member having a hook portion at one end that is adapted to enter a selected one of the openings in the member fixed to the wall. Means support the attaching member for pivotal movement relative to the crossbar between engaged and disengaged positions. The hook portion is adapted to be received in an opening when in its engaged position and coacts with the opening and the member in which the opening is formed to preclude removal of the hook portion from the member. Selectively releasable locking means retain the latching member in its engaged position and are releasable for pivotal movement of the attaching member from its engaged position to its disengaged position wherein the hook portion may be withdrawn from the opening in which it is received.

Other objects and advantages of this invention will become more apparent as this description proceeds, particularly when considered in conjunction with the accompanying drawings, wherein:

FIGURE 1 is a side elevational view, with portions shown in section, of a freight bracing crossbar embodying this invention and attached to a cargo area wall.

FIGURE 2 is a top plan view, with portions shown in section, of the crossbar and wall shown in FIGURE 1.

FIGURE 3 is an end view taken in the direction of the arrow 3 in FIGURE 1, with portions broken away.

FIGURE 4 is a cross-sectional view taken along the line 4—4 of FIGURE 2.

FIGURE 5 is a cross-sectional view, in part similar to FIGURE 4, showing the attaching means of the end fitting in a released position, and FIGURE 6 is a cross-sectional view taken along the line 6—6 of FIGURE 2.

Before referring specifically to the drawings, it is to be understood that this invention is directed to a means for attaching a freight bracing device to opposite walls of a cargo area for bracing freight within the cargo area. The invention has particular application in attaching a freight bracing device of the crossbar type and such device is shown in the drawings partially.

Referring now specifically to the drawings, one end of a freight bracing crossbar is identified generally by the reference numeral 11. The crossbar 11 is comprised of a body portion 12 which may be of tubular construction, of rectangular shape and that is adapted to engage freight. An end fitting assembly, indicated generally by the reference numeral 13, is provided at each end of the crossbar 11 for attaching the body portion 12 to spaced side walls 14 or to a separate attaching member that is affixed in any known manner to the side wall 14. The end fittings 13 at each end of the crossbar 11 are identical in construction and therefore only one end fitting is shown. It is to be understood that one or both of the end fittings 13 may be telescopic with respect to the crossbar body portion 11 so as to facilitate insertion and removal of the crossbar assembly 11 into the cargo area and to compensate for variations in the spacing between the walls.

The end fitting 13 comprises a generally rectangular tubular shaped housing 15 that is received in a complementary opening 16 formed in the respective end of the crossbar body portion 12. The housing 15 is open at its outer end with the exception of an upstanding flange 17 formed at its lower side for a purpose which will become more apparent as this description proceeds. A generally U-shaped member 18 having forwardly extending legs 19 and 21 receives and is journaled upon a pivot pin 22 that extends through and is affixed to the housing 15. Thus, the U-shaped member 18 is pivotally supported relative to the end fitting 13 upon the pivot pin 22. A second pivot pin 23 extends through the forward end of the arms 19 and 21 and passes through arcuately shaped apertures 24 formed in opposite sides of the housing 15.

An attaching forging, indicated generally by the reference numeral 25, is provided with a pair of cylindrical bosses 26 and 27 that are journaled upon the pivot pin 23 between the legs 19 and 21 of the U-shaped member 18. The forging 25 has three outwardly extending parts 28, each of which has a depending hook portion 29 that is adapted to extend through selected ones of longitudinally spaced apertures 31 formed in the wall 14. When the hook shaped portions 29 of the attaching forging 25 are received in the apertures 31 in the position shown in FIGURES 1 through 4, the end fitting 13 and accordingly the crossbar assembly 11 will be rigidly connected to the side walls 14 of the cargo area.

In order to positively restrain the attaching forging 25 in its attached position, a locking mechanism, indicated generally by the reference numeral 32, is provided. The locking mechanism 32 consists of a generally angular shaped piece having a horizontally extending leg 33 and a vertically extending leg 34. The horizontally extending leg 33 is adapted to be supported when in its engaged position upon an offset portion 35 of the upper wall of the housing 15 that defines a generally key-shaped opening 36. The locking mechanism 32 is completed by a second generally angular shaped piece having a vertically extending leg 37 that is affixed, as by a weld 38, to the leg 34. A horizontally extending leg 39 extends forwardly from the upper end of the leg 37 toward the open outer end of the housing 15.

When the locking mechanism 32 is in its engaged position, as shown in FIGURES 1 through 4, the leg 37 will extend between the pivot pins 22 and 23 and obstruct the path of movement of the pivot pin 23 downwardly in the slots 24 so that the U-shaped member 18 cannot be pivoted in a clockwise direction about the pivot pin 22. Pivotal movement of the attaching forging 25 about the pivot pin 23 is precluded by the forwardly extending horizontal leg 39 that is adapted to abut a pair of upstanding ears 41 (FIGURE 6) formed at the opposite sides of the attaching forging 25. The forging 25 also cannot pivot in a clockwise direction due to the contact of the lower surfaces of the extending portions 28 with the upper surface of the upstanding flange 17 of the housing 15. Hence, the end fitting 13 is rigidly secured to the wall 14 since the combined height of the hook portion 29 and extending portions 28 is greater than that of the hole 31. The forging 25 must, therefore, be pivoted about the pivot pin 23 for detachment from the wall 14.

When it is desired to disassemble the crossbar assembly 11 from the wall 14, the leg 33 of the locking member 32 is grasped by inserting an operator's fingers through the enlarged portion of the key-shaped opening 36 and sliding the locking mechanism 32 upwardly to the position shown in FIGURE 5. The locking member 32 is guided for this movement by the pivot pins 22 and 23. The operator may then insert his fingers through the key-shaped opening 36 which is now enlarged due to the removal of the leg 33 from this opening and grasp the underside of the U-shaped member 18 and pivot it in a clockwise direction (FIGURE 5). This rotation causes the U-shaped member 18 to move in a clockwise direction and causes the pivot pin 23 to move downwardly in the slots 24 since the locking member leg 47 no longer obstructs this movement. This causes the attaching forging 25 to pivot about a fulcrum defined by the upper end of the upstanding flange 17 and raises the hook portions 29 from behind the wall 14 into alignment with the apertures 31. The end fitting assembly 13 may then be withdrawn from the apertures 31.

It should be readily apparent that a relatively simple locking structure is provided for retaining the crossbar assembly in an adjusted position. In addition, a positive locking mechanism is provided so that the crossbar cannot be released accidentally. This locking assembly is easily releasable and yet is in a flush position with respect to the end fitting 15 when the crossbar is engaged with the cargo area side walls. Thus, the crossbar assembly 11 may be used for decking, that is, loads may be positioned directly upon the tops of the crossbar assembly 11.

While it will be apparent that the preferred embodiments of the invention are well calculated to fulfill the objects above stated, it will be appreciated that the invention is susceptible to modification, variation and change.

What is claimed is:

1. An end fitting for attaching a freight bracing crossbar or the like to a member having spaced openings which member is fixed relative to a wall of a cargo area, the crossbar including a housing having an access opening therein, said end fitting comprising an attaching member having a hook portion at one end thereof adapted to enter a selected one of the openings, means supporting said attaching member within the housing for pivotal movement relative to the crossbar between engaged and disengaged positions, said hook portion being adapted to be received in an opening in its engaged position and coacting with the opening and the member in which the opening is formed to preclude removal thereof from said opening, said attaching member having a portion adapted to be grasped through the access opening for pivoting said attaching member between its engaged and disengaged positions, and selectively releasable locking means for retaining said attaching member in its engaged position and releasable for pivotal movement of said attaching member from its engaged position to its disengaged position wherein said hook portion may be withdrawn from an opening in which it is received, said locking means being supported for sliding movement between a locking and a released position relative to the crossbar, said locking means having a part thereof adapted to engage a part of the attaching member when said locking means is in its locking position for precluding pivotal movement of said attaching member from its engaged position to its disengaged position, said locking means having a part thereof adapted to occupy at least part of the access opening when said locking means is in its locking position.

2. An end fitting for attaching a freight bracing crossbar or the like to a member having spaced openings which member is fixed relative to a wall of a cargo area, said end fitting comprising a pivoted member supported for pivotal movement about a first pivot axis relative to said end fitting, an attaching member pivotally supported by said pivoted member for movement about a second pivot axis, said attaching member having a portion adapted to cooperate with the member in which the spaced openings are formed when said attaching member is in a first position to affix said end fitting relative to the cargo area wall, means for transmitting pivotal movement of said pivoted member about said first pivot axis to pivotal movement of said attaching member from said first position to a second position wherein said end fitting may be detached from the cargo area wall, and locking means for precluding pivotal movement of said pivoted member about said first pivot axis and for precluding pivotal movement of said attaching member about said second pivot axis.

3. An end fitting for attaching a freight bracing crossbar or the like to a member having spaced openings which member is fixed relative to a wall of a cargo area, the crossbar including an open ended housing, said end fitting comprising a U-shaped member having a pair of extending legs, a first pivot pin extending through said legs of said U-shaped member for supporting said U-shaped member within the open end of the housing for pivotal movement about a first pivot axis relative to said end fitting, an attaching member, a second pivot pin pivotally supporting said attaching member upon said legs, said second pivot pin being spaced from said first pivot pin toward the open end of the housing and defining a second pivot axis, said attaching member having a hook portion extending from the open end of the housing and adapted to cooperate with the member in which the spaced openings are formed when said attaching member is in a first position for affixing said end fitting relative to the cargo area wall, and means for transmitting pivotal movement of said U-shaped member about said first pivot axis to pivotal movement of said attaching member from said first position to a second position wherein the end fitting may be detached from the cargo area wall.

4. An end fitting as set forth in claim 3 further including locking means for precluding pivotal movement of the pivoted member about the first pivot axis and for precluding pivotal movement of the attaching member about the second pivot axis.

5. An end fitting as set forth in claim 4 wherein the locking means comprises a first portion adapted to extend between said pivot pins when said end fitting is in its attached position and when said locking means is in its locking position for precluding pivotal movement of the U-shaped member in a first direction about the first pivot pin, said locking member having a second portion adapted to engage said attaching member for precluding pivotal movement of said attaching member about the second pivot pin in at least one direction.

6. An end fitting as set forth in claim 5 wherein the housing is formed with an access opening through which the U-shaped member may be grasped for pivoting it about the first pivot pin, the locking member having a third portion adapted to overlie said access opening when said locking member is in its locking position.

7. An end fitting as set forth in claim 6 wherein the housing is formed with a flange that is adapted to engage the attaching member for precluding pivotal movement of said attaching member about the second pivot pin in a direction opposite to that precluded by the second locking member portion when said end fitting is attached to the cargo area wall, said flange providing a fulcrum for pivoting said attaching member about said second pivot pin when said locking means is released and when the U-shaped member is pivoted about the first pivot pin.

References Cited

UNITED STATES PATENTS

| | | |
|---|---|---|
| 2,440,437 | 4/1948 | Fahland. |
| 2,556,302 | 6/1951 | Stough et al. |
| 2,567,658 | 9/1951 | Stough. |
| 3,130,690 | 4/1964 | Johnston. |

DRAYTON E. HOFFMAN, *Primary Examiner.*